United States Patent
Pham et al.

(10) Patent No.: US 9,425,628 B2
(45) Date of Patent: Aug. 23, 2016

(54) VEHICLE BATTERY PACK COOLING SYSTEM

(75) Inventors: Thanh D. Pham, Canton, MI (US); Jesus Cardoso, Allen Park, MI (US); David Hayes, Northville, MI (US); Jason C. Marcath, Dearborn, MI (US); Darko Acevski, Sterling Heights, MI (US); Karin Lovett, Novi, MI (US); Hsiao-An Hsieh, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 898 days.

(21) Appl. No.: 13/469,950

(22) Filed: May 11, 2012

(65) Prior Publication Data

US 2013/0302653 A1 Nov. 14, 2013

(51) Int. Cl.
*H01M 10/613* (2014.01)
*H01M 10/625* (2014.01)
*H02J 7/00* (2006.01)
*B60L 1/00* (2006.01)
*B60L 3/00* (2006.01)
*B60L 11/18* (2006.01)
*H01M 2/10* (2006.01)
*H01M 10/63* (2014.01)
*H01M 10/6563* (2014.01)
*H01M 10/617* (2014.01)
*H01M 10/6566* (2014.01)

(52) U.S. Cl.
CPC . *H02J 7/00* (2013.01); *B60L 1/003* (2013.01); *B60L 3/003* (2013.01); *B60L 11/1864* (2013.01); *B60L 11/1874* (2013.01); *B60L 11/1877* (2013.01); *B60L 11/1879* (2013.01); *H01M 2/1077* (2013.01); *H01M 10/613* (2015.04); *H01M 10/617* (2015.04); *H01M 10/625* (2015.04); *H01M 10/63* (2015.04); *H01M 10/6563* (2015.04); *H01M 10/6566* (2015.04); *B60L 2200/36* (2013.01); *B60L 2210/30* (2013.01); *B60L 2240/421* (2013.01); *B60L 2240/525* (2013.01); *B60L 2240/545* (2013.01); *Y02T 10/642* (2013.01); *Y02T 10/7005* (2013.01); *Y02T 10/7061* (2013.01); *Y02T 10/7241* (2013.01); *Y02T 90/16* (2013.01); *Y10T 29/49002* (2015.01); *Y10T 29/49117* (2015.01)

(58) Field of Classification Search
CPC .......... B60L 111/1874; H01M 10/625; H01M 10/63; H01M 10/6563; H01M 10/617; H01M 10/6566
See application file for complete search history.

(56) References Cited

U.S. PATENT DOCUMENTS 6,094,927 A 8/2000 Anazawa
6,315,069 B1 11/2001 Suba
(Continued)

OTHER PUBLICATIONS

Ecogeek, Does the Nissan Leaf Have an Achilles Heel?, The Global Warming Statistics website, Aug. 30, 2010, 2 pages, http://www.theglobalwarmingstatistics.org/global-warming-blog/does-the-nissan-leaf-have-an-achilles-heel.

*Primary Examiner* — Barbara Gilliam
*Assistant Examiner* — Stephan Essex
(74) *Attorney, Agent, or Firm* — Carlson, Gaskey & Olds, P.C.

(57) ABSTRACT

The present disclosure relates to a vehicle battery pack cooling system, including: a housing; a fan attached to the housing; a first section of the housing including a battery module selectively in fluid communication with the fan; a second section of the housing including a battery support device selectively in fluid communication with the fan; and a baffler assembly configured to control fluid communication between the fan and the first and second sections.

20 Claims, 7 Drawing Sheets

(56) References Cited

U.S. PATENT DOCUMENTS 6,800,385 B2 10/2004 Harth
7,240,752 B2 7/2007 Takahashi
7,607,501 B2 10/2009 Smith
2006/0073378 A1* 4/2006 Hamery et al. ............... 429/120
2012/0082871 A1* 4/2012 Simonini et al. ............... 429/50

* cited by examiner

VEHICLE BATTERY PACK COOLING SYSTEM

TECHNICAL FIELD

The present disclosure relates to thermal management systems for vehicle battery packs.

BACKGROUND

Hybrid electric and electric vehicles include a battery pack to supplement or support the vehicle powertrain during operation. The battery pack generally requires cooling. Cooling systems can include a fan to direct air away from the battery cells and/or modules in the battery pack. Battery pack support devices, e.g., a charger, generator, convertor or other device may require cooling as well. In the past, a separate fan has been dedicated to the battery support device. Two fans serve different functions: the first, to cool the high voltage battery pack when the vehicle is in driving mode; and the second, to cool a charger when the vehicle is in park and/or being charged. Each fan requires additional costs for parts, assembly, packaging, warranty and failure mode management. Accordingly, it is desirable to have a single fan cooling system that cools both the battery pack and any battery support device.

U.S. Pat. No. 6,094,927 titled "Cooling Structure and Electric Vehicle" regards a secondary air passage positioned underneath battery cells, which has a smaller cross-section than the primary passage in order to increase flow to an electric part. Individualized air flow management is not provided, however, where the cooling system can separately control flow between to battery modules and the electric part.

Therefore, it is desirable to have a cooling system for a vehicle battery pack that supports independent cooling of the battery module(s) and battery support devices but with the use of a single fan.

SUMMARY

The present disclosure addresses one or more of the above-mentioned issues. Other features and/or advantages will become apparent from the description which follows.

One exemplary embodiment relates to a vehicle battery pack cooling system, including: a housing; a fan attached to the housing; a first section of the housing including a battery module selectively in fluid communication with the fan; a second section of the housing including a battery support device selectively in fluid communication with the fan; and a baffler assembly configured to control fluid communication between the fan and the first and second sections.

Another exemplary embodiment relates to a method of manufacturing a battery cooling system, the method including: attaching a fan to a housing having a common conduit between a battery module, a battery support device and the fan; and providing a baffler assembly configured to selectively route air between the fan and battery module or battery support device.

Another exemplary embodiment pertains to a method of controlling a cooling system for a vehicle battery pack, the method including: powering a fan; routing air between a vehicle battery module and the fan when a vehicle is operating in a driving mode; and routing air between the fan and a battery support device when the vehicle is operating in an on-charge mode.

Yet another exemplary embodiment pertains to a method of controlling a cooling system for a battery pack, the method having: powering a fan; assessing the temperature of the battery pack; and routing air between the fan, a battery module and a battery support device based on the temperature assessment.

One advantage of the present disclosure is that this application uses a single fan for dual-mode cooling in a vehicle battery pack. The disclosed cooling systems offer cooling to both the battery modules and a battery support device. The single fan also has the dual function of pushing and pulling air into different sections of the battery pack.

The invention will be explained in greater detail below by way of example with reference to the figures, in which the same reference numbers are used in the figures for identical or essentially identical elements. The above features and advantages and other features and advantages of the present invention are readily apparent from the following detailed description of the best modes for carrying out the invention when taken in connection with the accompanying drawings. In the figures:

DETAILED DESCRIPTION

Figure 1:
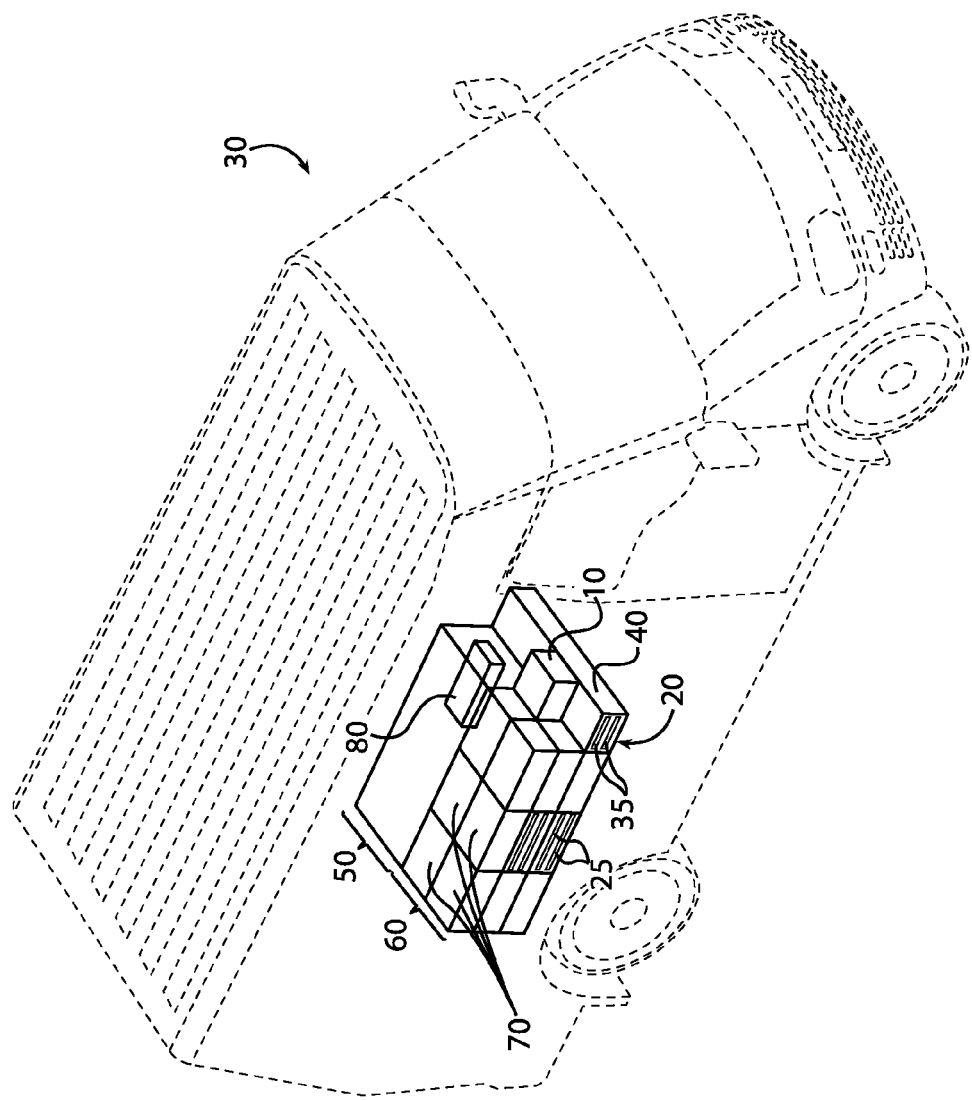
FIG. 1 is a schematic depiction of a vehicle with battery pack and an exemplary battery pack cooling system.

Referring to the drawings, wherein like characters represent examples of the same or corresponding parts throughout the several views, there are shown various battery pack cooling systems or thermal management systems. The illustrated battery pack cooling systems are for use with hybrid electric or all electric vehicles. Cooling systems are attached to the battery pack housing and selectively produce airflow through the housing with respect to the battery modules and any battery support devices. Cooling systems include a baffler assembly that routes air from a single fan into a designated area of the battery pack housing, i.e., where cooling is immediately desired.

A fan module 10, as shown in FIG. 1, is attached to the battery pack housing 20. The shown vehicle 30 is an electric vehicle. An air duct 40 is directly attached to the fan module 10. Air duct 40 is also attached to two sections 50, 60 of the battery pack housing 20. Fan module 10 includes a 30 W fan. Any sort of motor-driven fan can be used. Fan module is linked to a vehicle auxiliary power source (e.g., a Pb-acid battery). In conservation of energy, in one embodiment, the fan is controlled by a battery charger to optimize cooling and minimize power consumption during charging. Air duct 40 is connected to each section 50, 60 of the housing 20. This design uses a single fan (as discussed with respect to FIGS. 2-5) to cool the high-voltage battery modules 70 by pulling hot exhaust air out of section 60 during a vehicle driving mode of operation and pushing fresh air into a section 70 while in a vehicle charge mode to cool the battery charger 80.

Figure 2:
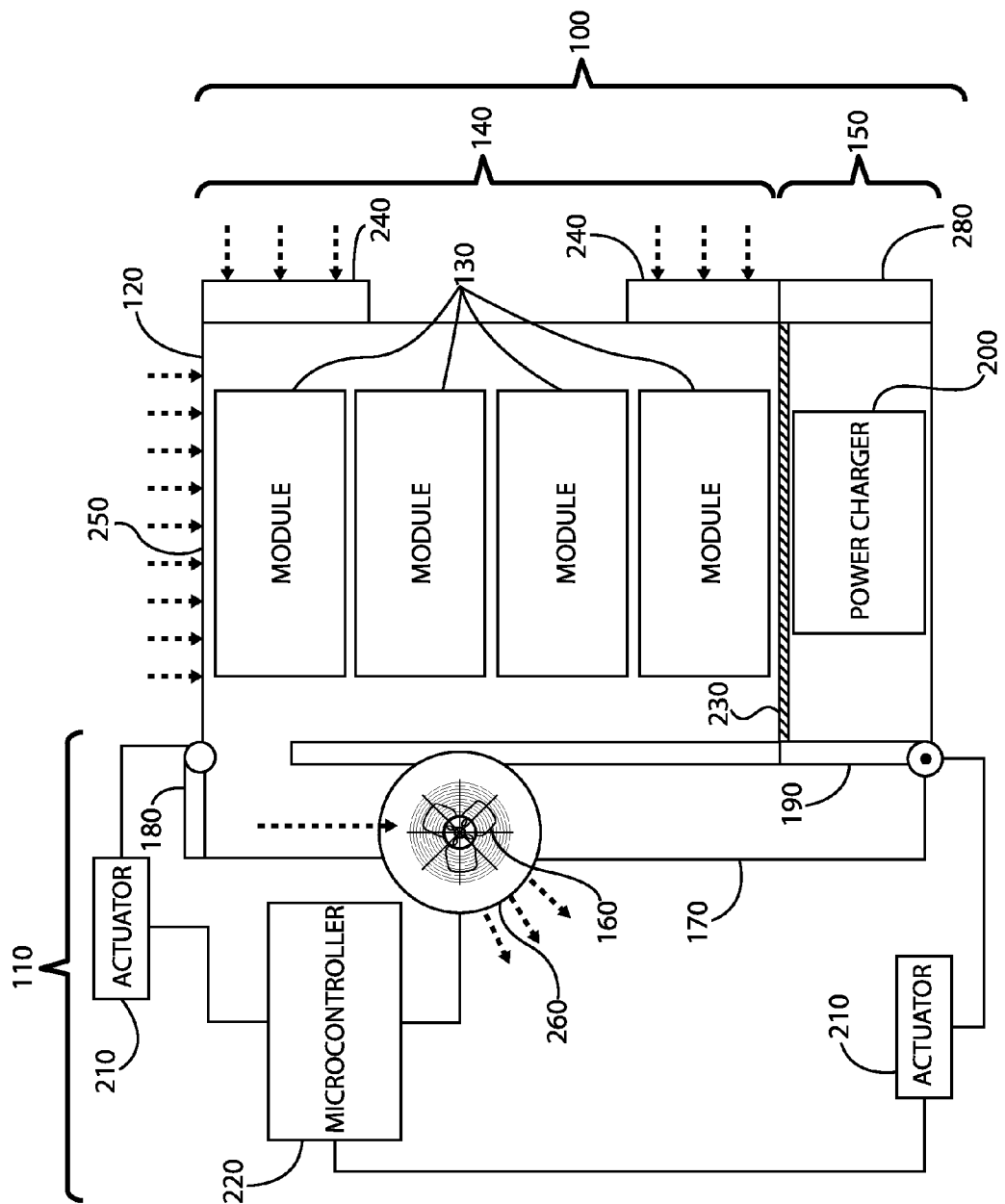
FIG. 2 is a schematic depiction of a battery pack cooling system compatible with the battery pack of FIG. 1, when a vehicle is in a driving mode of operation.
Figure 3:
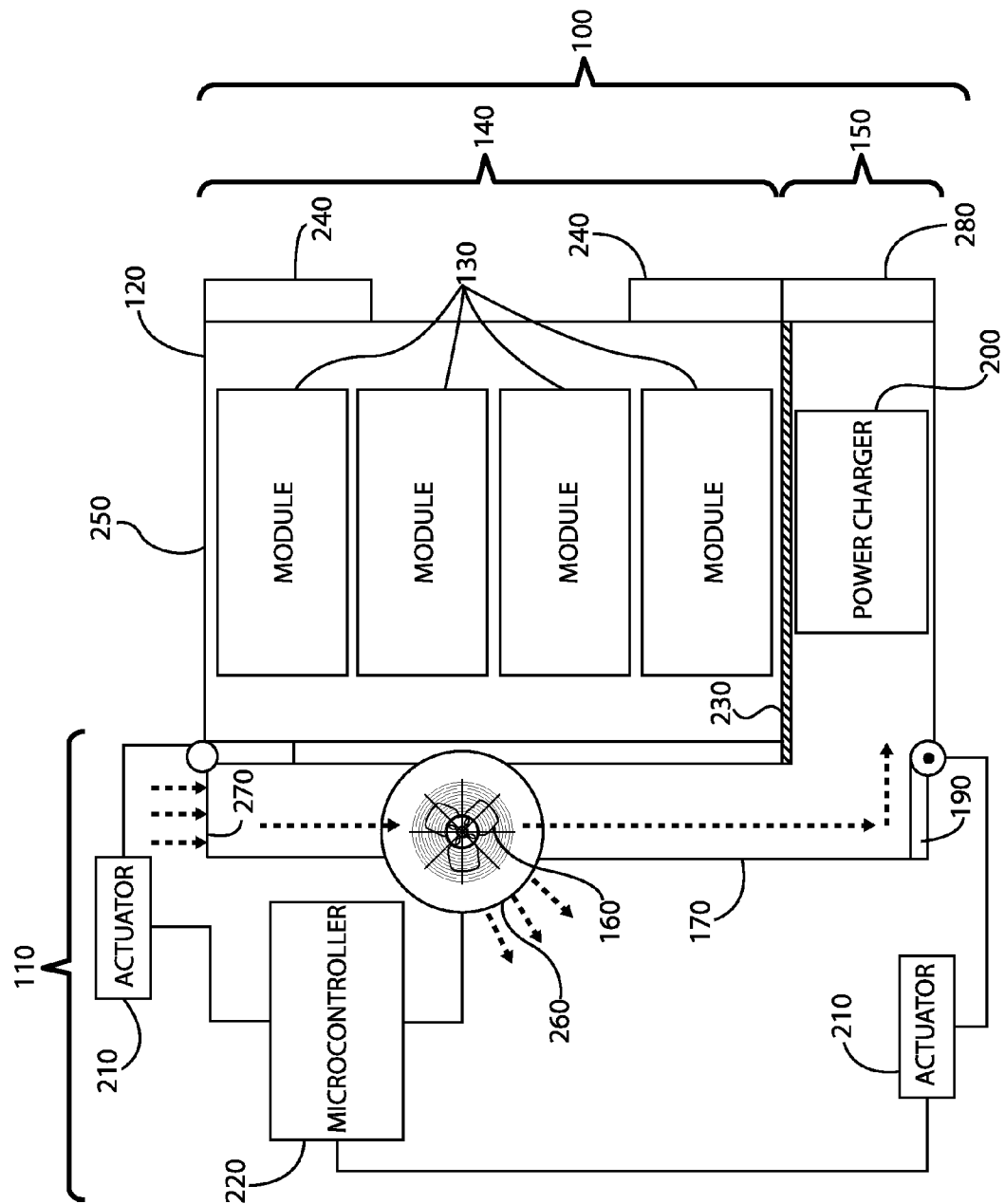
FIG. 3 is a schematic depiction of the battery pack cooling system of FIG. 2 with the vehicle in an on-charge mode of operation.

Referring now to FIG. 2, there is shown therein a battery pack 100. A battery pack cooling system 110 is attached to the battery pack 100. The battery pack 100 is shown with a housing 120 having several battery modules 130 stored therein. Housing 120 is separated into two sections 140 and 150. In section 140 battery modules 130 are housed. Section 140 is selectively in fluid communication with a fan 160 through duct 170. A pivotable baffle 180 (blend door or vent door) is included in section 140 of the housing 120. Baffle 180 is a part of a two-part baffler assembly. Baffle 180 is hinged to section 140 and configured to obstruct air flow between the fan 160 and section 140 when in a closed position (as shown in FIG. 3) and allow air flow therethrough when in an opened position (as shown in FIG. 2).

Section 150, as shown in FIG. 2, includes a battery support device 200, which is a power charger in this embodiment. Section 150 can also house other support devices including, for example, converters or generators. Section 150 is connected to duct 170 at another end of the duct. Baffle 190 is hinged to section 150 and configured to obstruct air flow between the fan 160 and section 150 when in a closed position (as shown in FIG. 2) and allow air flow therethrough when in an opened position (as shown in FIG. 3). Baffles 180 and 190 are composed of a metallic material in this embodiment but can be formed from any material including polymers, wood or other materials.

Baffles 180 and 190 are controlled by motor-driven actuators 210 in the illustrated embodiment of FIG. 2. Actuators 210 are configured to adjust positions of the baffles 180 and 190. A microcontroller 220 is linked to each actuator 210 and configured to control the position of the baffles 180 and 190. Microcontroller 220 is also linked to the fan 160 and configured to control power distribution to the fan. Microcontroller 220 is further configured to control fan direction by reversing current flow to the fan. For example, air can be pulled across or pushed across either section 140 or 150 of the battery pack. Microcontroller 220 can be integrated with a battery energy control module (BECM or BCM) configured to control battery operation with respect to battery modules 130 in the battery pack 100. Microcontroller 220 can also be a separate controller or incorporated with any other vehicle controller (e.g., the powertrain control module (PCM), vehicle control module (VCM) or restraint control module (RCM)).

A divider 230, as shown in FIG. 2, is positioned between section 140 and section 150 so that air flowing to the battery modules 130 does not flow to the battery support device 200 and vice versa. In FIG. 2, the vehicle in which the battery cooling system 110 supports is operating in a driving mode. In driving mode, battery pack 100 supports the vehicle powertrain, thus the battery pack 100 experiences higher temperatures. Baffle 180 is shown in an opened position. Air is pulled through vents in housing wall (e.g., 25 as shown in FIG. 1). Referring back to FIG. 2, housing 120 also includes two inlets 240 in section 140 of housing 120. Fan 160 pulls vehicle cabin air that in some instances is cooled by the HVAC, into battery pack housing 120, through inlets 240 and vents at 250 and exhausts the heated air at an outlet vent at 260. When the vehicle in which the battery pack 100 supports is operating in a charge mode baffle 180 is in a closed position as shown in FIG. 3. Baffle 190 is in an opened position. Air is inlet through a vent at 270 in the duct 170 (e.g., 35 as shown in FIG. 1). Vent 270 can be connected to the vehicle cabin or the exterior of the vehicle to pull ambient air into the battery pack housing 120. Air is routed through duct 170 to section 150 and exhausted through outlet 280.

In this embodiment, baffles 180 and 190 are controlled according to vehicle mode of operation. Battery pack receives information regarding vehicle mode of operation and is controlled by the battery control module (or BCM). Information regarding vehicle mode of operation is broadcasted through the vehicle CAN. BCM is linked to a vehicle control module (or VCM) and controlled according to vehicle mode of operation.

Alternatively the microcontroller, 220 as shown in FIGS. 2-3, includes logic to determine vehicle mode of operation based on temperature sensors in the battery pack. Microcontroller 220 includes a look-up table, e.g., Table 1 shown below, that indicates vehicle mode of operation based upon predetermined temperature targets. In an embodiment where a battery module temperature runs higher than a predetermined threshold—which, in this case is 75 degrees F.—the microcontroller determines that the vehicle is operating in a driving mode. In driving mode, battery module energy is being disseminated and the battery module sees relatively higher temperatures. When the battery module temperature is below the predetermined threshold the microcontroller determines that the vehicle is not operating in a driving mode.

TABLE 1

Temperature Look-Up Table

| Module Temperature | Support Device Temperature | Mode of Operation | Fan Power (RPMs) |
|---|---|---|---|
| >75° F. | n/a | Driving | 2k |
| <=75° F. | n/a | On-charge | 3k |
| n/a | >55° F. | On-charge | 2k |
| n/a | <=55° F. | Driving | 3k |

Battery support device temperature can also be used to indicate vehicle mode of operation. When the charger temperature exceeds a predetermined threshold, e.g., 55 degrees F., the microcontroller determines that the vehicle is operating in a charging mode. An exemplary charging mode is when the vehicle is plugged in and being recharged or when regenerative braking or engine devices are supplying power to the charger. When the charger temperature is below the predetermined threshold, e.g., 55 degrees F., the microcontroller determines that the vehicle is operating in a charging mode. After the battery module or charger reaches its predetermined temperature the respective baffle doors move towards a closed position. This dynamic active control method adjusts the baffling doors as the temperatures in each section changes. A closed-loop control method is programmed into the microcontroller to receive continuous updates on the module and charger temperature to change the baffle position accordingly. Look-up table data can be obtained empirically, for example, or derived based upon thermal modeling.

Figure 4:
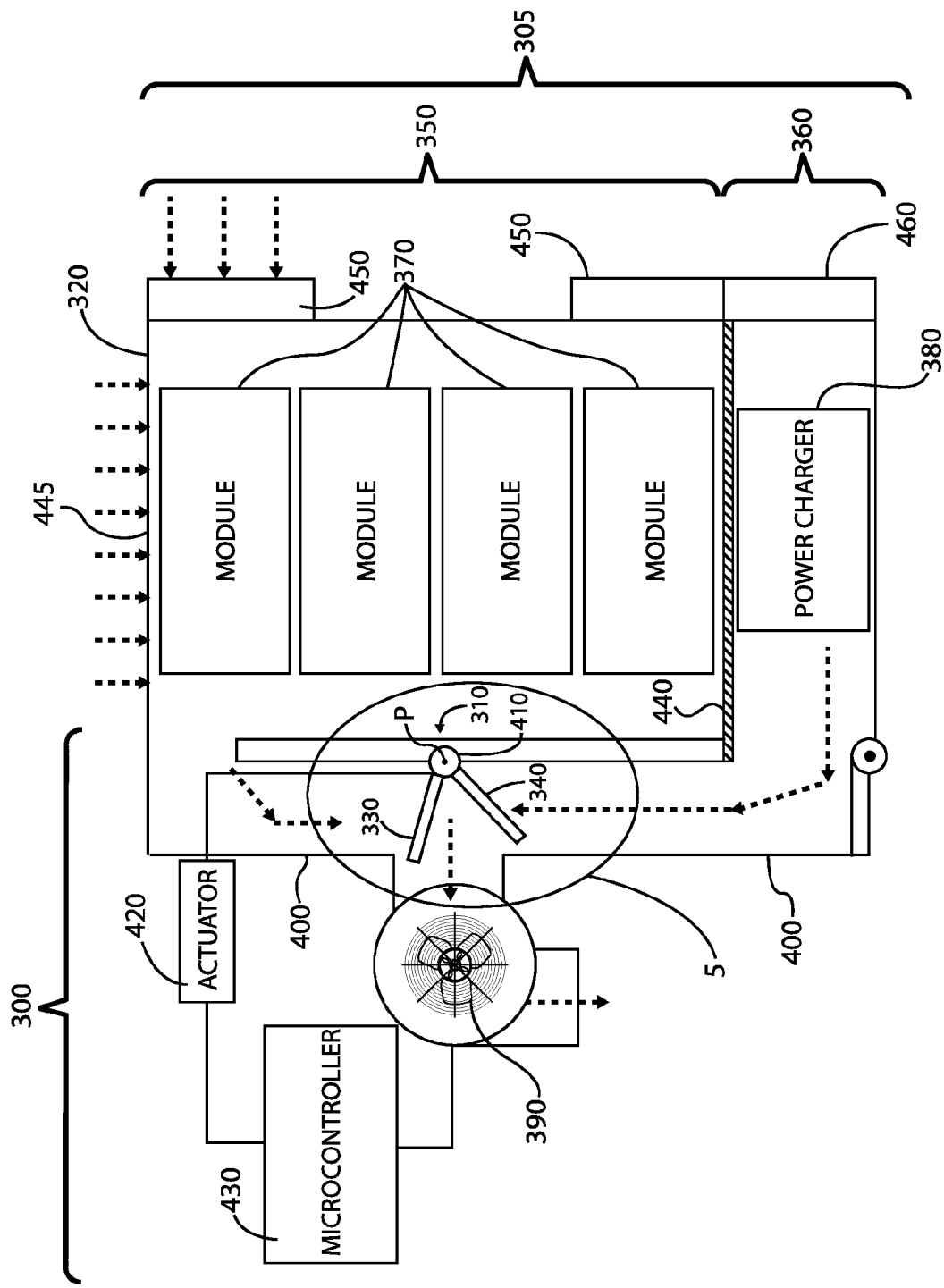
FIG. 4 is a schematic depiction of an alternative embodiment of a battery pack cooling system.

Turning now to FIG. 4, an alternative battery pack cooling system 300 is shown. In the embodiment illustrated in FIG. 4, a joined pivotable baffler assembly 310 is included in the battery pack housing 320. Baffle 330 is fixedly hinged to baffle 340. Housing 320 is separated into two sections 350 and 360. In section 350 battery modules 370 are housed. In section 360 a power charger 380 is housed. Each section 350, 360 is selectively in fluid communication with a fan 390 through duct 400. The pivotable two-door baffler assembly 310 is included in duct 400. Baffles 330 and 340 are hinged to the housing 320 and configured to obstruct air flow between the fan 390 and section 350 or section 360 depending on the angular disposition of each baffle with respect to a center line of hinge 410 (as discussed in more detail with respect to FIG.

5). Section 360, as shown in FIG. 4, includes the battery support device 280. In this illustration, the battery support device 380 is a power charger. Section 360 can also house other support devices. Section is connected to duct 400 as well.

The baffler assembly 310 is controlled by a single actuator 420 in the illustrated embodiment of FIG. 4. Actuator 420 is configured to adjust positions of each baffle 330 and 340 simultaneously. Actuator 420 is motor-driven. A microcontroller 430 is linked to the actuator 420 and configured to control the position of the baffles 330 and 340. Microcontroller 430 is also linked to the fan 390 and configured to control power distribution to the fan. Microcontroller 430 is further configured to control fan direction by reversing current flow to the fan. Microcontroller 430 can be integrated with a battery energy control module (BECM or BCM) configured to control battery operation with respect to battery cells in the battery pack. A divider 440, as shown in FIG. 4, is positioned between section 350 and section 360 so that air flowing to the battery modules 370 does not flow to the battery support device 380 and vice versa.

Figure 5:
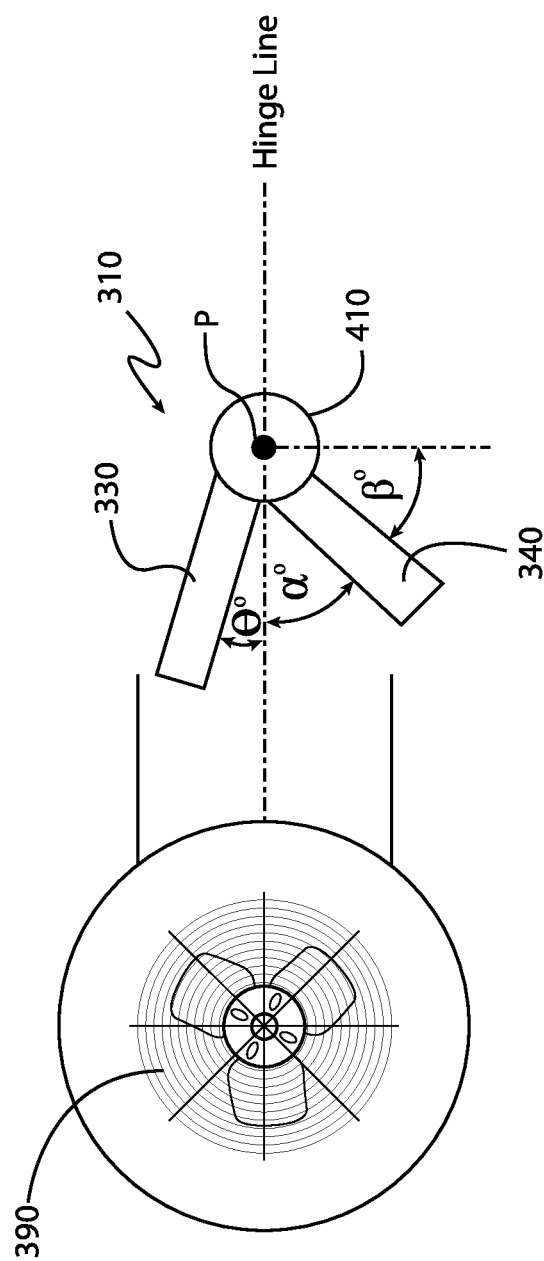
FIG. 5 is a schematic depiction of a baffler assembly taken along circle 5 in FIG. 4.

As shown in FIG. 5, baffles 330 and 340 in baffler assembly can be positioned at different angular positions in order to increase or decrease flow to section 350 and section 360, respectively. In this embodiment, baffles 330 and 340 are separated by a 45 degree angle. However, baffles 330 and 340 can have a greater or smaller fixed disposition with respect to each other. The angular disposition of baffle 330 with respect to a hinge line, which can be the center line of hinge 410 or collinear with the pivot point, P, of the hinge, is represented as theta, $\theta$. The angular disposition of baffle 340 with respect to the hinge line is represented as alpha, $\alpha$. Since baffles 330 and 340 are fixed with respect to each other the sum of alpha and theta is fixed. When no air flow to section 350 is desired theta is equal to one-half of the angular position between baffle 330 and baffle 340. When increased air flow to section 350 (as shown in FIG. 4) is desired, theta is changed. Similarly, when increased air flow to section 360 (as shown in FIG. 4) is desired, alpha is altered. Baffler assembly 310 can rotate so that either theta or alpha equals 90 degrees in this embodiment. The angular disposition of either baffle 330 or 340 can be measured from an external angle. As shown in FIG. 5, for example, beta, $\beta$, is measured from an axis perpendicular to the longitudinal axis of duct 400 and baffle 340. In other embodiments, baffler assembly is configured to rotate 360 degrees so that no obstructions of air flow to either section are present.

The angular disposition of each baffle 330 and 340 is also associated with a percentage of full airflow that is provided to the battery pack 305. For example, the commonly hinged baffles 330 and 340 in FIG. 4 may open to a calibrated angle that allows 20% of air to flow through to the battery modules in section 350 and 80% of the air to flow through to the charger in section 360. These associations between percentage airflow and angle of each baffle are stored in the BCM calibration logic.

In FIG. 4, the vehicle in which the battery cooling system 300 supports is operating in a charging mode. Both sections 350 and 360 are being cooled with more air being provided to section 360. Baffle 340 angular disposition with respect to the hinge line, alpha, is greater than baffle 330 angular position, theta. Air is pulled through vents in housing wall at 445. Housing 320 also includes two inlets 450 in section 350 of housing 320. Fan 390 pulls ambient air into battery pack housing 320 and exhausts the heated air at outlet 460.

Air flow to either section 350 or section 360 as shown in FIG. 4 is conditioned upon the angular position of baffles 330 and 340 as shown in FIG. 5. In one embodiment, microcontroller 430 includes calibration logic having stored therein angular dispositions for the baffles 330 and 340 according to cooling demand for the battery module or battery support device. Cooling demand is quantified according to the temperature differential between the actual and desired running temperature of a battery device. A temperature sensor (e.g., 580 or 590 as discussed with respect to FIG. 6) is included in the battery pack to measure charger or module temperatures. If either battery device is running higher than intended the cooling demand for the device is defined by the drop in degrees necessary to establish the target temperature.

The microcontroller 430 is configured to control the position of the baffles 330 and 340 based on temperature readings and cooling demand, as shown with respect to Table 2 below.

TABLE 2

Baffle Angular Disposition per Cooling Demand

| Module Cooling Demand | Support Device Cooling Demand | $\theta°$ | $\alpha°$ | Fan Power (RPMs) |
|---|---|---|---|---|
| minus 5° F. | none | 20° | 25° | 2k |
| minus 10° F. | none | 5° | 40° | 3k |
| none | minus 5° F. | 15° | 30 | 2k |
| none | minus 10° F. | 0 | 45 | 3k |

Table 2 outlines calibration logic stored in the microcontroller 430. Calibration data is stored in a look-up table that is derived empirically in this embodiment. Where the cooling demand for the battery module is a temperature drop of 5 degrees F., theta is reduced to 20 degrees. If the cooling demand is greater, e.g., 10 degrees or more, theta is reduced to 5 degrees so as to increase the cross-sectional flow area between the fan 390 and section 350 (as shown in FIG. 4). Fan speed is also increased by 1,000 RPM. Where the cooling demand for the battery support device is a temperature drop of 5 degrees F., alpha is reduced to 15 degrees. If the cooling demand is greater, e.g., 10 degrees or more, alpha is reduced to 0 degrees so as to increase the cross-sectional flow area between the fan and section 360. Fan speed can also be increased.

In other embodiments, other cooling system performance characteristics can be adjusted independent or in tandem with the baffler assembly position. For example, in one embodiment, fan speed alone can be increased or decreased according to cooling demand. The angular disposition of baffles can change as well as the power provided to the fan. In another embodiments, ducting size changes during operation to improve cooling. Other components of the cooling system can be tweaked to yield different cooling patterns. For example, the fan location can be designed to optimize system air flow restriction for both battery and charger heat extraction rates. Vent door (or baffle) location, motor and cam design for actuating the baffles, circuit of air flow through battery modules and charger (i.e., push or pull) can also be altered to produce varied cooling results.

Figure 6:
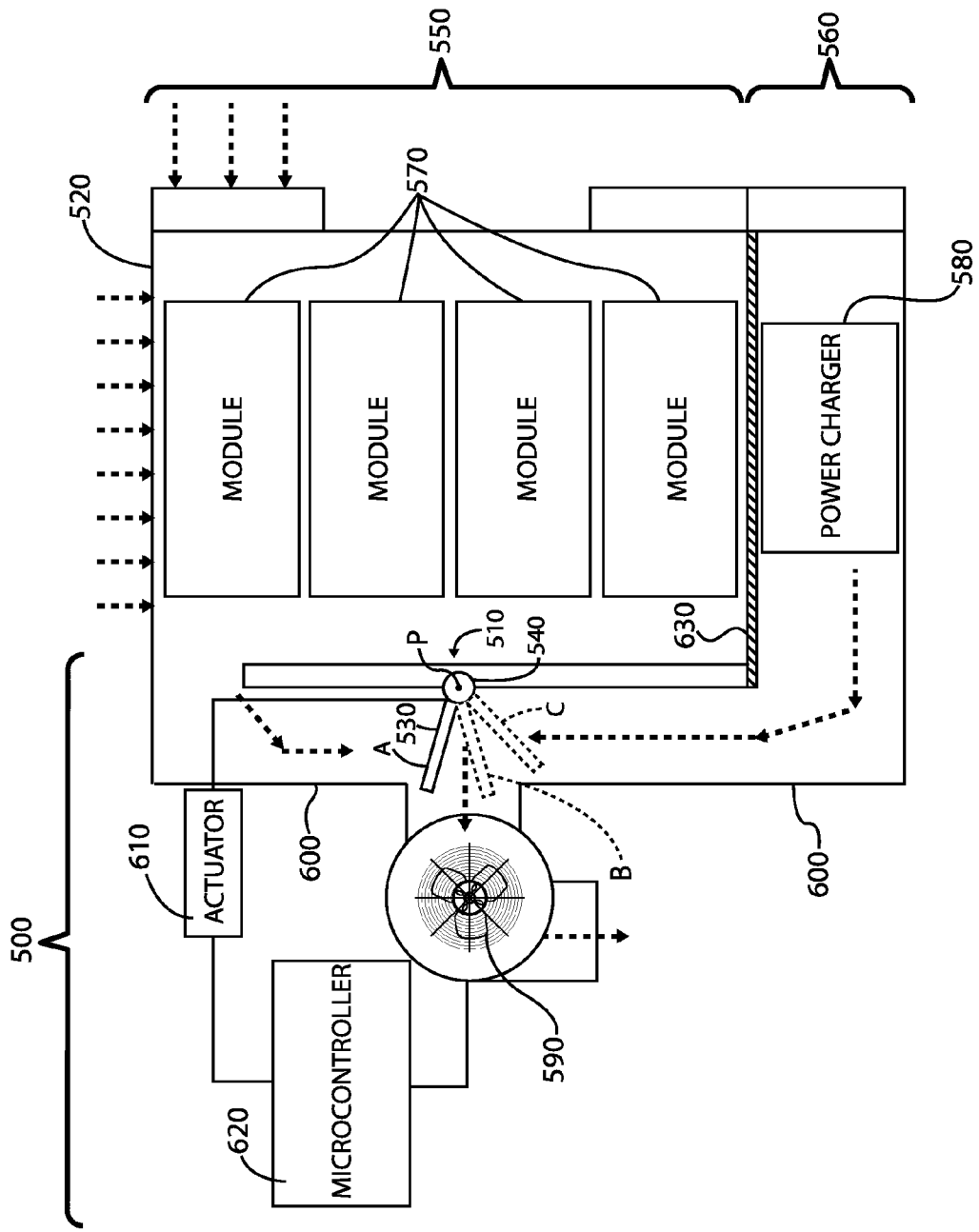
FIG. 6 is a schematic depiction of an alternative embodiment of a battery pack cooling system.

Another alternative battery pack cooling system 500 is shown in FIG. 6. In the embodiment illustrated in FIG. 6, another type of pivotable baffler assembly 510 is included in the battery pack housing 520. Baffle 530 is fixedly hinged to the battery housing 520 via hinge 540. Housing 520 is again separated into two sections 550 and 560. In section 550 battery modules 570 are housed. In section 560 a power charger 580 is housed. Each section 550, 560 is selectively in fluid communication with a fan 590 through duct 600.

The baffler assembly 510 (as shown in FIG. 6) includes a single baffle 530 positionable in at least three positions (A, B and C). Baffle 530 is controlled by a single motor-driven actuator 610 in the illustrated embodiment of FIG. 6. In position A the fan 590 pulls air from section 560 over the charger 580. In position B the fan 590 circulates air to the charger 580 and the battery modules 570. In position C, the fan 590 is primarily in fluid communication with the battery modules 570. In either position baffle has an angular disposition that can be measured with respect to the battery housing 520. A microcontroller 620 is linked to the actuator 610 and configured to control the position of the baffle 530. Various angular dispositions for baffle 530 can be programmed into the microcontroller 620 to control air flow between the fan 590 and sections 550, 560. Microcontroller 620 is also linked to the fan 590 and configured to control power distribution to the fan. A divider 630, as shown in FIG. 6, is positioned between each section 550, 560.

Figure 7:
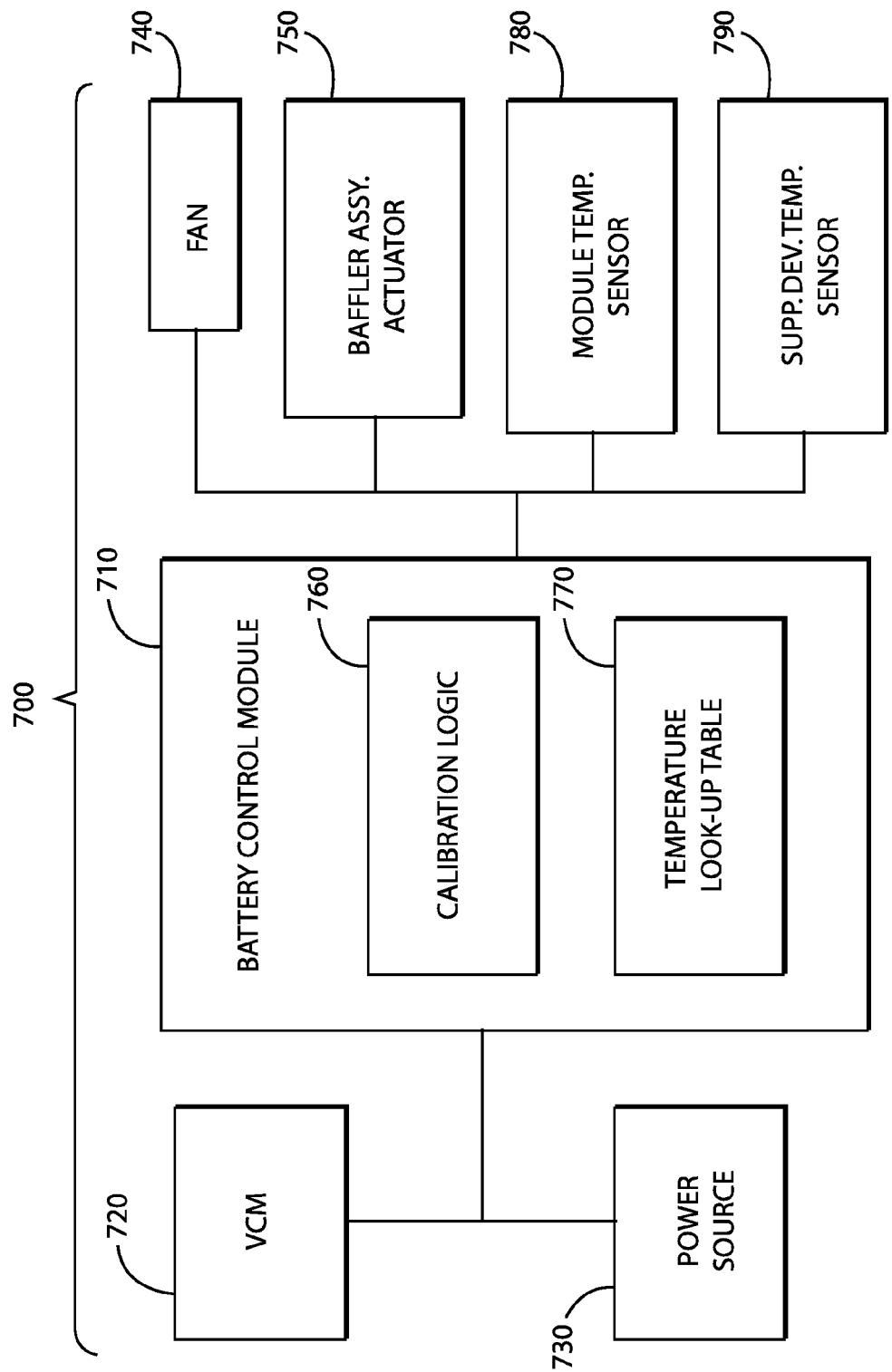
FIG. 7 is a schematic depiction of an exemplary control circuit for a battery pack cooling system.

Now with reference to FIG. 7, there is shown therein a control circuit 700 for the battery cooling system. The control circuit 700 is compatible with any of the afore-illustrated battery pack cooling systems. As shown in FIG. 7, the control circuit 700 includes a central processing unit or microcontroller 710 in the battery control module. BCM 710 is linked to a vehicle control module (or VCM) 720 over a vehicle CAN network. VCM 720 is configured to send a signal indicative of a vehicle mode of operation. VCM 720 can communicate details about vehicle performance, e.g., transmission gear (PRNDL), HVAC operation and vehicle mode of operation, particularly for hybrid electric vehicles.

BCM 710 is also linked to a power source 730. Power source 730 can be, for example, battery cells in the battery pack, a battery support device, or another battery. BCM 710 controls a switch that selectively links a fan 740 or baffler assembly actuators 750 to the power source.

As shown in FIG. 7, BCM 710 includes calibration logic 760 and a temperature look-up table 770 akin to that which was previously discussed. BCM 710 is configured to execute a method of controlling the battery pack cooling system. The method includes the steps of: (i) powering a fan; (ii) assessing the temperature of the battery pack; and (iii) routing air between the fan, a battery module and a battery support device based on the temperature assessment. BCM 710 assesses battery pack temperature through a module temperature sensor 780 and a support device temperature sensor 790. Temperature sensors 780, 790 are positioned to take the temperature of battery modules and the support device, respectively. BCM 710 controls air routing through control of an actuator for the baffler assembly (750 as shown). Multiple actuators, e.g., 210, as shown in FIG. 2, for a plurality of baffles can also be controlled by the BCM.

With respect to the temperature look-up table 770 of FIG. 7, BCM is configured to compare temperature assessments to the temperature look-up table having air routing instructions per temperature (e.g., as shown with respect to Table 1); and routing air between the fan, battery module and battery support device according to a temperature look-up table settings.

BCM 710 is further configured to compare temperature assessments to calibration logic having stored therein angular dispositions for baffles between the fan and battery module or battery support device per temperature (e.g., as shown with respect to Table 2); and positioning the baffle according the calibration logic.

A method of controlling a cooling system for a battery pack is also disclosed. The method includes: powering a fan; routing air between a vehicle battery module and the fan when the vehicle is operating in a driving mode; and routing air between the fan and a battery support device when the vehicle is operating in an on-charge mode. BCM is further configured to assess the temperature of the battery pack and determine a vehicle mode of operation based on temperature assessment. BCM has stored therein the temperature look-up table, e.g., as shown with respect to Table 1, to correlate temperature readings with the vehicle mode of operation.

Also disclosed is a method of manufacturing a battery cooling system, the method includes the steps of: attaching a fan to a housing having a common conduit between a battery module, a battery support device and the fan (e.g., 160 or 390 as shown in FIGS. 2-4); and providing a baffler assembly (e.g., 310) configured to selectively route air between the fan and battery module or battery support device. The step of providing a baffler assembly includes: providing a baffle configured to obstruct air flow between the fan and the battery module (e.g., 130 as shown with respect to FIGS. 2-3); providing a baffle configured to obstruct air flow between the fan and the battery support device (e.g., 200 as shown with respect to FIGS. 2-3); and providing a microcontroller configured to control the position of the baffles (e.g., 220 as shown with respect to FIG. 2-3).

As shown in FIGS. 4-7, the method of manufacture can also include hinging a single or multiple baffles to the battery pack housing so that the baffles rotate with respect to the battery pack housing. Thus, yielding additional degrees of controllability for the cooling system. In another embodiment, the method includes linking a temperature sensor to the battery cooling system (e.g., 780 and 790 as shown with respect to FIG. 7); and programming a microcontroller for the baffler assembly to control routing of air between the fan, battery module and battery support device based on temperature readings.

While the best modes for carrying out the invention have been described in detail, those familiar with the art to which this invention relates will recognize various alternative designs and embodiments for practicing the invention within the scope of the appended claims.

We claim:

1. A vehicle battery pack cooling system, comprising:
a housing;
a fan attached to the housing;
a first section of the housing including a battery module selectively in fluid communication with the fan by selectively communicating fluid received through at least one first fluid inlet location along a fluid communication path extending from the fan to the first section;
a second section of the housing including a battery support device selectively in fluid communication with the fan by selectively communicating fluid received through at least one second fluid inlet location along a fluid communication path extending from the fan to the second section, each at least one first fluid inlet location different than each at least one second fluid inlet location, the second section forming no portion of the fluid communication path extending from the fan to the first section; and
a baffler assembly configured to control fluid communication between the fan and the first and second sections.

2. The cooling system of claim 1, wherein the battery support device is a power charger.

3. The cooling system of claim 1, wherein the baffler assembly includes:
a first baffle configured to obstruct air flow between the fan and the first section when in a closed position and allow air flow therethrough when in an opened position;

a second baffle configured to obstruct air flow between the fan and the second section when in a closed position and allow air flow therethrough when in an opened position; and a microcontroller configured to control the position of the first and second baffles.

4. The cooling system of claim 3, further comprising:
an actuator linked to the microcontroller, the actuator configured to adjust positions of the first and second baffles.

5. The cooling system of claim 3, wherein the first baffle is pivotally hinged to the second baffle.

6. The cooling system of claim 5, wherein the microcontroller includes: calibration logic having stored therein angular dispositions for the first and second baffles according to cooling demand for the battery module or battery support device.

7. The cooling system of claim 3, further comprising:
a temperature sensor linked to the microcontroller;
wherein the microcontroller is configured to control the position of the first and second baffles based on temperature readings.

8. The cooling system of claim 3, further comprising:
a temperature sensor linked to the microcontroller;
wherein the microcontroller includes a temperature lookup table having air routing instructions per temperature readings.

9. The cooling system of claim 3, wherein the microcontroller is configured to control battery operation with respect to battery cells in the battery pack.

10. The cooling system of claim 1, further comprises:
a divider between the first and second sections so that air flowing from the fan to the battery module does not flow to the battery support device and vice versa.

11. The cooling system of claim 1, wherein the baffler assembly includes:
a baffle attached to the housing; and
a microcontroller configured to control the position of the baffle;
wherein the baffle is configured to obstruct air flow between the fan and the first section when in a first position and allow air flow therethrough when in a second position;
wherein the baffle is further configured to obstruct air flow between the fan and the second section when in a second position and allow air flow therethrough when in the first position.

12. The cooling system of claim 11, further comprising:
an actuator linked to the microcontroller, the actuator configured to adjust positions of the baffle.

13. A vehicle battery pack cooling system, comprising;
a battery pack housing having a first section to house a battery module and a second section to house a battery support device;
a divider within the housing to block direct flow between the first section and the second section while permitting flow between a fan and the first section; and
a baffler assembly separate and distinct from the divider and configured to control communication between the fan and the first section of a fluid drawn through at least one first housing inlet, the baffler assembly further configured to control communication between the fan and second section of a fluid drawn through at least one second housing inlet, each at least one first housing inlet different than each at least one second housing inlet.

14. The cooling system of claim 1, wherein the battery support device is a power charger.

15. The cooling system of claim 13, wherein the baffler assembly includes:
a first baffle configured to obstruct air flow between the fan and the first section when in a closed position and allow air flow therethrough when in an opened position;
a second baffle configured to obstruct air flow between the fan and the second section when in a closed position and allow air flow therethrough when in an opened position; and
a microcontroller configured to control the position of the first and second baffles.

16. The cooling system of claim 14, further comprising:
an actuator linked to the microcontroller, the actuator configured to adjust positions of the first and second baffles.

17. The cooling system of claim 14, wherein the first baffle is pivotally hinged to the second baffle.

18. The cooling system of claim 13, wherein the divider is between the first and second sections so that air flowing to the battery module from the fan does not flow to the battery support device and vice versa.

19. The cooling system of claim 13, wherein the baffler assembly includes:
a baffle attached to the housing; and
a microcontroller configured to control the position of the baffle;
wherein the baffle is configured to obstruct air flow between the fan and the first section when in a first position and allow air flow therethrough when in a second position;
wherein the baffle is further configured to obstruct air flow between the fan and the second section when in a second position and allow air flow therethrough when in the first position.

20. The cooling system of claim 1, further comprising a divider that is separate from the baffler assembly and configured to permit air to exit from the second section while blocking air exiting from the second section from flowing to the first section.

* * * * *